(12) United States Patent
Caponi

(10) Patent No.: US 7,214,021 B2
(45) Date of Patent: May 8, 2007

(54) HELICAL GROOVED PIN

(75) Inventor: Richard C. Caponi, Brooklyn, CT (US)

(73) Assignee: Spirol International Corporation, Danielson, CT (US)

( * ) Notice: Subject to any disclaimer, the term of this patent is extended or adjusted under 35 U.S.C. 154(b) by 16 days.

(21) Appl. No.: 10/743,940

(22) Filed: Dec. 23, 2003

(65) Prior Publication Data

US 2005/0144887 A1    Jul. 7, 2005

(51) Int. Cl.
*F16B 15/08* (2006.01)

(52) U.S. Cl. .................. 411/454; 411/453; 411/425; 403/298

(58) Field of Classification Search ........... 403/292, 403/294, 298, DIG. 11, DIG. 13; 411/351, 411/453, 452, 451.4, 425, 454
See application file for complete search history.

(56) References Cited

U.S. PATENT DOCUMENTS

| | | | |
|---|---|---|---|
| 354,154 A | 12/1886 | Libbey | |
| 435,463 A | 9/1890 | Stewart | |
| 456,723 A * | 7/1891 | Harvey | 411/452 |
| 752,669 A | 2/1904 | Guzowski | |
| 1,326,910 A | 1/1920 | Butterfield | |
| 2,056,309 A | 10/1936 | Osenberg | 85/19 |
| 2,094,731 A | 10/1937 | Von Mertens | 80/6 |
| 2,219,197 A | 10/1940 | Purtell | 85/19 |
| 2,223,871 A | 12/1940 | Johnson | 86/6 |
| 2,251,202 A | 7/1941 | Purtell | 85/19 |
| 3,759,623 A | 9/1973 | Hesse | 403/298 |
| 3,977,142 A * | 8/1976 | Dove et al. | 411/453 |
| 4,220,052 A | 9/1980 | Sheldon | 474/207 |
| 5,037,234 A | 8/1991 | De Jong | 403/268 |
| RE34,928 E * | 5/1995 | Highfield | 411/453 |
| 5,658,109 A | 8/1997 | Van Allman et al. | 411/440 |
| 5,867,958 A | 2/1999 | Ditka et al. | 52/410 |

(Continued)

FOREIGN PATENT DOCUMENTS

DE    2243564    9/1972

(Continued)

OTHER PUBLICATIONS

SPIROL Solid Pins, © 2001 Spirol International Corporation 2.5M Sep. 2001, U.S.A.

(Continued)

*Primary Examiner*—Daniel P. Stodola
*Assistant Examiner*—Michael P. Ferguson
(74) *Attorney, Agent, or Firm*—Alix, Yale & Ristas, LLP

(57) ABSTRACT

A helical grooved pin for insertion into a hole in a hard host material includes a formed portion of helical lands and grooves. Pin material from the grooves is displaced to define lands at an expanded diameter relative to the pin stock material. The forming process employs a rolling die configured to produce substantially uniform cylindrical land surfaces. The helical lands have a width that is at least five times the height of the land. The expanded diameter of the formed portion of the pin is no more than 5% larger than the diameter of the pin stock material. These proportions provide a uniform, durable and reliable retaining surface to the pin which is particularly useful in applications where the host material is harder than the pin.

9 Claims, 6 Drawing Sheets

U.S. PATENT DOCUMENTS 6,042,429 A     3/2000     Bianca et al. ............. 439/733.1
6,254,301 B1     7/2001     Hatch .......................... 403/298
6,692,207 B1 *     2/2004     Bailey ........................ 411/453

FOREIGN PATENT DOCUMENTS

DE     2243564     3/1974
GB     629722     9/1949
GB     844644     8/1960

OTHER PUBLICATIONS

Grooved Pins and Drive Studs, © GROOV-PIN Corp., 1984, U.S.A.

* cited by examiner

Figure 10

| Nominal Diameter | Body Diameter "D1" | | Hole Diameter | | Expanded Diameter "D2" | |
|---|---|---|---|---|---|---|
| | Min | Max | Min | Max | Min | Max |
| 1.5 | 1.45 | 1.5 | 1.52 | 1.55 | 1.57 | 1.62 |
| 2 | 1.95 | 2.0 | 2.02 | 2.05 | 2.07 | 2.12 |
| 2.5 | 2.45 | 2.5 | 2.52 | 2.55 | 2.57 | 2.62 |
| 3 | 2.95 | 3.0 | 3.02 | 3.05 | 3.07 | 3.12 |
| 4 | 3.95 | 4.0 | 4.02 | 4.05 | 4.07 | 4.12 |
| 5 | 4.95 | 5.0 | 5.02 | 5.05 | 5.07 | 5.12 |
| 6 | 5.95 | 6.0 | 6.02 | 6.05 | 6.07 | 6.12 |

Table 2

| D2/D1 | | D2/Hole Dia. | |
|---|---|---|---|
| Min | Max | Min | Max |
| 105% | 112% | 101% | 107% |
| 104% | 109% | 101% | 105% |
| 103% | 107% | 101% | 104% |
| 102% | 106% | 101% | 103% |
| 102% | 104% | 100.5% | 103% |
| 101% | 103% | 100.4% | 102% |
| 101% | 103% | 100.3% | 102% |

Formula

D1 Max = Nominal Diameter
D1 Min = Nominal Diameter -0.05mm
Hole Min = D1 Max +0.02mm
Hole Max = D1 Max +0.05mm
D2 Min = Hole Max +0.02mm
D2 Max = Hole Max +0.07mm

Figure 11

| Nominal Diameter | Body Diameter "D1" | | Hole Diameter | | Expanded Diameter "D2" | |
|---|---|---|---|---|---|---|
| | Min | Max | Min | Max | Min | Max |
| 1.5 | 1.45 | 1.5 | 1.52 | 1.55 | 1.57 | 1.62 |
| 2 | 1.95 | 2.0 | 2.02 | 2.05 | 2.07 | 2.12 |
| 2.5 | 2.45 | 2.5 | 2.52 | 2.55 | 2.57 | 2.62 |
| 3 | 2.95 | 3.0 | 3.02 | 3.05 | 3.07 | 3.12 |
| 4 | 3.95 | 4.0 | 4.02 | 4.05 | 4.07 | 4.12 |
| 5 | 4.95 | 5.0 | 5.02 | 5.05 | 5.07 | 5.12 |
| 6 | 5.95 | 6.0 | 6.02 | 6.05 | 6.07 | 6.12 |

| D2/D1 | | D2/Hole Dia. | |
|---|---|---|---|
| Min | Max | Min | Max |
| 105% | 112% | 101% | 107% |
| 104% | 109% | 101% | 105% |
| 103% | 107% | 101% | 104% |
| 102% | 106% | 101% | 103% |
| 102% | 104% | 100.5% | 102% |
| 101% | 103% | 100.4% | 102% |
| 101% | 103% | 100.3% | 102% |

Table 3

Formula

D1 Max = Nominal Diameter
D1 Min = Nominal Diameter -0.05mm
Hole Min = D1 Max +0.02mm
Hole Max = D1 Max +0.05mm
D2 Min = Hole Max +0.02mm
D2 Max = Hole Max +0.07mm

HELICAL GROOVED PIN

FIELD OF THE INVENTION

The present invention relates generally to pins employed in mechanical assemblies and more particularly to pins having surface features that enhance pin retention in a host.

BACKGROUND OF THE INVENTION

Pins are common machine elements typically employed to ensure accurate positioning of parts or to transmit relatively small shear forces. Many types of pins have been developed for a variety of applications, including cotter pins, spring pins, straight pins, grooved pins, taper pins and knurl pins. Of these, the invention relates most closely to knurl pins and grooved pins employed as positioning pins. In a typical positioning pin application, first and second parts to be positioned define holes at complementary positions. Pins are installed in the holes of the first part. The pins protrude from the first part to align second part relative to the first part by engaging the holes of the second part. Ideally, the pins are centered in both sets of holes and exert some frictional force on the holes.

Knurl pins are pins having an outside surface that is deformed into a plurality of straight or helical knurls. The knurled surface portion of the pin includes a series of crests and troughs, with pin material from the troughs displaced to the crests to define an expanded outside diameter for the pin. A common knurled surface is one in which the crests have a width (measured perpendicular to the crest length) that is approximately 10% of the pitch of the knurl pattern. This shape of knurl is relatively sharp. Typically, the knurl pin material is harder than the host material, allowing the crests of the knurled outside surface to cut into the softer host material to provide enhanced retention of the pin in the host. An exemplary prior art knurled pin is shown in FIG. 1.

A grooved pin enhances retention force by disrupting the outside surface of a straight solid pin with one or more V-grooves. Pin material adjacent the V-groove is displaced upwardly and outwardly to each side of the groove, forming a raised portion or flute extending alongside the groove. The crests of the flutes provide an expanded diameter a few thousandths larger than the nominal diameter of the pin. When a grooved pin is driven into a drilled hole of a predetermined diameter, the raised portion of the pin is supposed to be forced back into the groove where it resiliently exerts a radially outward retaining force against the inside surface of the hole in the host. The above-described theoretical operation of a grooved pin is rarely achieved in practice. In soft host materials, the grooved pin crests dig into the host, while in hard host materials, the crests are scraped off as further discussed below. A sectional view of an exemplary prior art grooved pin is shown in FIG. 2.

Knurl pins and grooved pins are most successful when the host material is no harder than the pin material. In assemblies where the host material is significantly harder than the pin, high profile raised features with small sectional areas tend to be sheared away as the pin is driven into the host as shown in FIGS. 7 and 8. As a result, retention force and other measures of pin performance are severely compromised. This is particularly the case in assemblies that are repeatedly taken apart and reassembled.

There is a need in the art for a solid pin that provides reliable and repeatable press-fit retention and positioning in a host having hardness greater than the pin.

SUMMARY OF THE INVENTION

A helical grooved pin in accordance with aspects of the present invention is a pin with an outside surface formed into a plurality of grooves and lands. The lands have a low profile and make up a majority of the outside surface of the pin to define a substantially cylindrical expanded outside diameter of the pin. In a helical grooved pin according to aspects of the present invention, the lands have a substantially uniform surface and extend around a majority of the pin. The uniformity of the land surface and the helical configuration of the pin surface provide a cylindrical contact surface radially outward of the pin stock surface. The land surfaces have a width (measured perpendicular to the length of the pin) that is at least approximately 40% of the pitch of the knurl pattern. The lands have a width:height ratio of at least approximately 5.

The more uniform and larger width surface features of a helical grooved pin according to aspects of the present invention are far less likely to be sheared off by a hard host material than the surface features of prior art knurl or groove pins. The intervening grooves allow the expanded portion of the helical grooved pin to deform as it is driven into the host so that the retention force is evenly distributed around the circumference of the pin. The resulting pin requires less force to insert and has a higher retention force than prior art pins when driven into a host material that is harder than the pin.

An object of the present invention is to provide a new and improved press-fit fastener for hardened host materials.

DESCRIPTION OF THE DRAWINGS

This and other objects, features and advantages of the invention will become apparent to those skilled in the art upon reading the description of the preferred embodiments, in conjunction with the attached drawings, in which:

FIG. 10 and 11 illustrate Tables 2 and 3.

DETAILED DESCRIPTION OF AN EXEMPLARY EMBODIMENT

Figure 3:
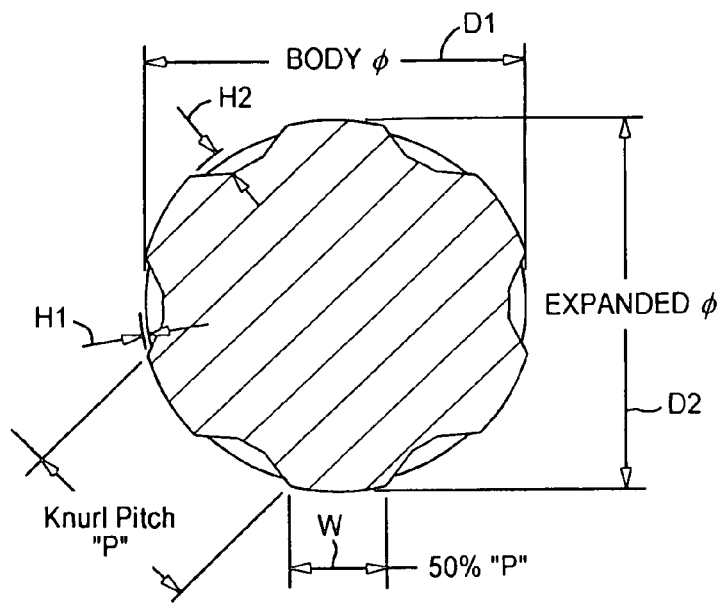
FIG. 3 is a sectional view of a helical groove pin according to aspects of the present invention.
Figure 4:
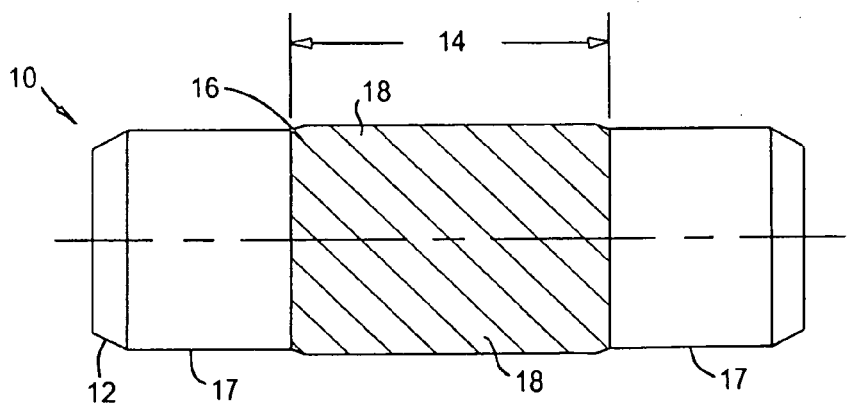
FIGS. 4 and 5 are side and end views, respectively of a helical groove pin according to aspects of the present invention.
Figure 5:
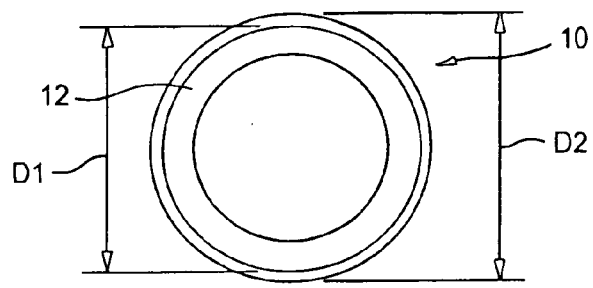

An exemplary embodiment of a helical grooved pin according to aspects of the present invention is illustrated in FIGS. 3–6 and is generally designated by the numeral 10. FIG. 3 is a sectional view through the exemplary helical knurl pin 10 illustrating the groove and land pattern in section relative to an unformed pilot portion of the pin. A central portion 14 of the exemplary pin is formed into a plurality of helical lands 16 alternating with helical grooves

18. The helical knurl/groove pattern is oriented at an angle of approximately 45° relative to the pin axis. Material from the helical grooves 18 is displaced by a forming process into the helical lands 16 at an expanded diameter D2 relative to the diameter D1 of the pin stock.

For the illustrated exemplary embodiment, the pin stock material has a nominal diameter of approximately 0.116 inches and an expanded diameter of approximately 0.120 inches. The land surfaces of the formed portion of the pin have a diameter D2 approximately four thousandths (0.004") greater than the pin stock diameter D1. In the illustrated exemplary embodiment, D2 is approximately 3.5% greater than D1.

An aspect of the present invention relates to the width W of the lands when measured perpendicular to the pin length versus the height H1 of the land relative to the pin stock diameter D1. A helical grooved pin 10 according to the present invention is characterized by lands 16 wherein the width W is at least five times the height H1. In the case of the exemplary embodiment, each land 16 is approximately two thousandths of an inch (0.002") above the pin stock diameter D1 and is approximately 28 thousandths of an inch wide (0.028"), for a width to height ratio of approximately 14:1. With reference to FIG. 3, a related aspect of the invention is the width W of the land 16 with respect to the pitch P of the groove/land pattern. In the embodiment of FIG. 3, the width W of the land surface is approximately equal to the width of the grooves or approximately 50% of the groove/land pitch P. A range of land widths from approximately 40% to approximately 60% of the groove land pitch P are within the scope of the present invention.

A yet further related aspect of the present invention relates to the proportion of the pin expanded portion 14 surface area occupied by the lands 16. In the exemplary embodiment, the lands 16 represent approximately one-half of the formed portion surface area. The lands 16 provide a retaining surface that engages the inside surface of the hole in the host material. An aspect of the present invention relates to a retaining surface that occupies at least approximately 40% of the expanded portion of the pin. A range of land surface areas of between 40% and 60% of the surface area of the expanded portion of the pin are within the scope of the present invention.

With further reference to FIG. 3, the trough-to-peak height H2 of the groove/land pattern is approximately six thousandths of an inch (0.006") from the bottom of the trough to the top of the land surface. This represents approximately 5% of the diameter of the pin stock D1.

Figure 1:
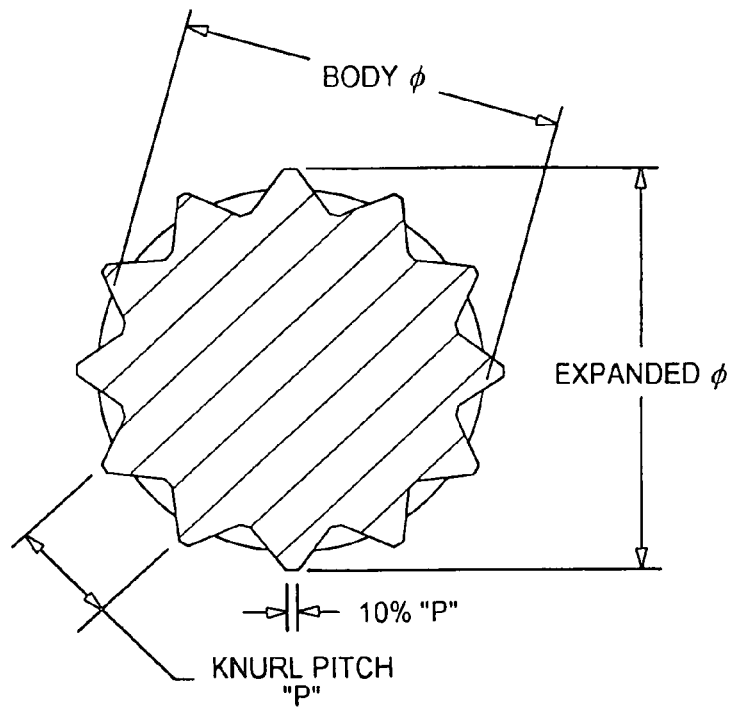
FIG. 1 is a sectional view of a prior art helical knurl pin.
Figure 2:
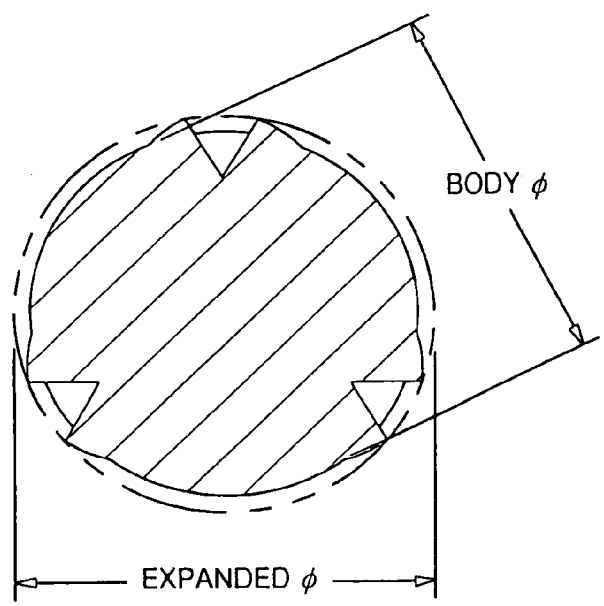
FIG. 2 is a sectional view of a prior art grooved pin.

The proportions and arrangement of the lands 16 according to aspects of the present invention can be contrasted with the prior art knurl pin and grooved pin shown in FIGS. 1 and 2, respectively. The prior art knurl pin shown in FIG. 1 illustrates a typical prior art groove and land pattern where the land surfaces or crests are sharp and represent only approximately 10% of the pitch P of the groove/land pattern. The knurl land surfaces also represent a small portion of the overall surface area of the expanded portion of the knurl pin. The relatively sharp knurl crests have a significantly higher profile relative to the pin stock diameter than the lands 16 of the exemplary helical grooved pin 10. In a typical knurl pin, the helical crest and groove pattern is oriented at approximately 30° relative to an axis of the pin. In this pattern, each knurl crest will traverse a smaller portion of the circumference of the pin for a given unit of length than the 45° pattern of the exemplary helical grooved pin 10. While a helical angle of 45° has proven successful in the context of the exemplary pin, a range of helical knurl angles between 30° and 60° are intended to be within the scope of the present invention.

The prior art grooved pin shown in FIG. 2 exemplifies a class of pin where the pin stock is upset by V-shaped grooves that displace pin material upwardly and outwardly to define raised surface portions of the pin. As shown in FIG. 2, the raised portions of the pin are relatively narrow with respect to the circumference or surface area of the expanded portion of the pin. FIG. 2 illustrates the expected pattern of metal flow produced by the cold forming grooving technique. Similar metal flows occur in a knurling technique. Typically, the grooving or knurling forming processes do not involve compacting the crests of the knurl or groove pattern. As a result, the knurled or grooved portions of the pin include sharp edges or peaks where metal has been pushed upward by the forming process but not smoothed or compacted in any way.

The prior art knurl and groove pins shown in FIGS. 1 and 2 are typically employed in host materials that are softer than the pin. The small surface area, high profile knurl and groove patterns of these pins are compatible with softer materials because their raised features can either dig into the softer material or form a mutually compressed frictional engagement with the host material. When these prior art pins are employed in a host material that is harder than the pin, the sharp relatively narrow surface features are cut or "skived" away from the pin and the frictional interface between the pin and the host is seriously compromised.

Figure 6:
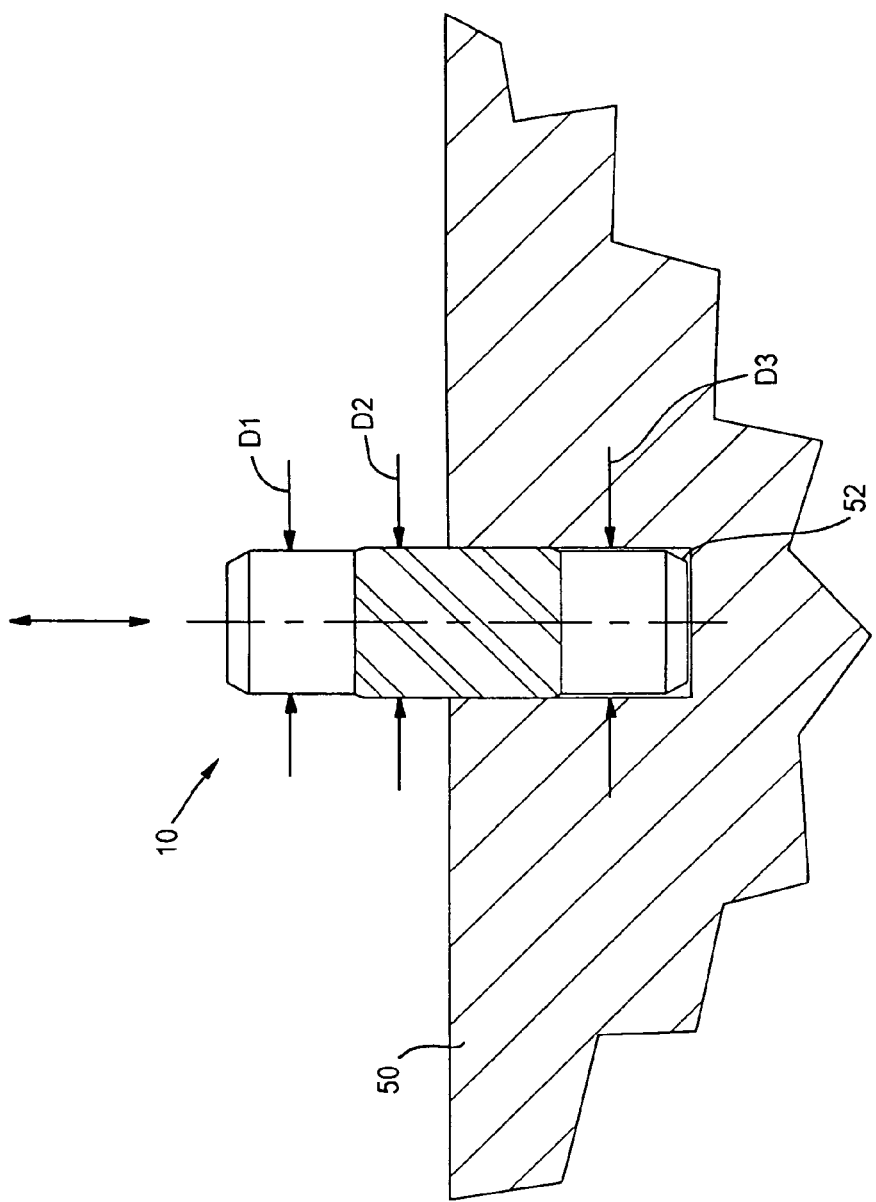
FIG. 6 is a cut away view of a host material and a helical groove pin according to aspects of the present invention installed in a hole defined by the host material.

FIG. 6 illustrates an exemplary helical grooved pin 10 in accordance with aspects of the present invention seated in a hole 52 defined by a hard host material 50. In accordance with aspects of the present invention, the host 50 shown in FIG. 6 is harder than the pin 10. Hardness is variously defined as resistance to local penetration, to scratching, to machining, to wear or abrasion, and to yielding. In the context of this specification, hardness is intended to mean the resistance to localized penetration or indentation hardness. This measure is widely used industrially as a measure of hardness and indirectly as an indicator of other desired properties in a manufactured product. Several indentation tests are used including the Brinell, Vickers and Rockwell tests. In particular, this specification will refer to the hardness of materials on a Rockwell C scale. The Rockwell C test uses a brale as an indenter and a major load of 150 kilograms. A brale is a spherical-tipped, conical diamond of 120° angle and 0.2 millimeter tip radius. Under the Rockwell method, a minor load of 10 kilograms is first applied which causes an initial penetration and holds the brale indenter in place. Under this condition, the dial is set to "0" and the major load of 150 kilograms applied. Upon removal of the major load, the reading is taken while the minor load is still on. Soft materials, which with deep penetration, give low hardness numbers.

In an exemplary combination shown in FIG. 6, the host material 50 has a Rockwell C hardness in the range of RC-60 to 62 while the pin has a Rockwell C hardness in the range of RC-43 to 49.

Figure 9:
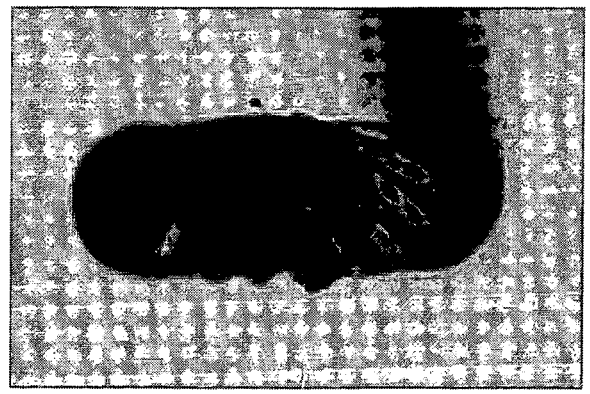
FIG. 9 is an enlarged view of a helical grooved pin according to aspects of the present invention after insertion and removal from a hardened block.
Figure 8:
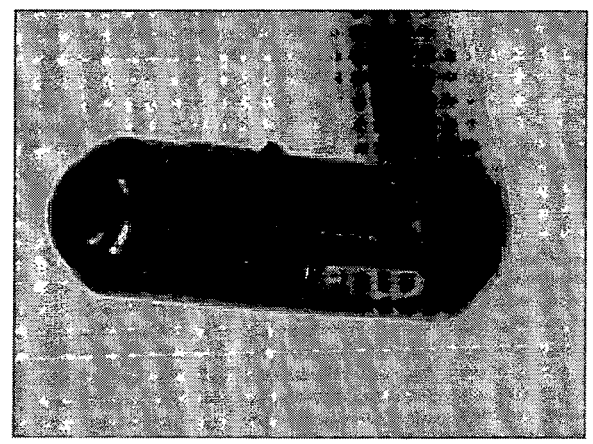
FIG. 8 is an enlarged view of a prior art grooved pin after insertion and removal from a hole in a hardened block.
Figure 7:
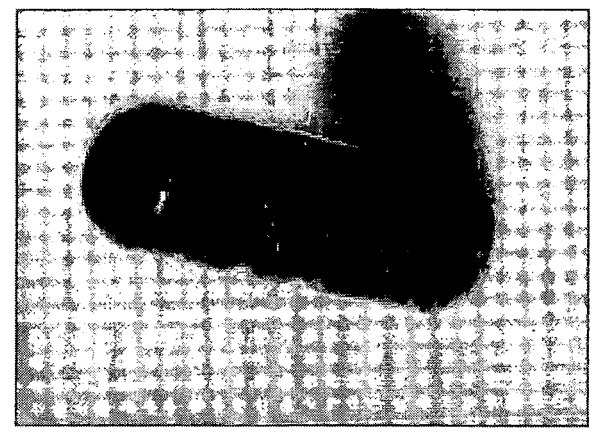
FIG. 7 is an enlarged view of a prior art knurled pin after insertion and removal from a hole in a hardened block.

A comparison of helical grooved pins 10 according to aspects of the present invention with prior art knurled pins, and prior art grooved pins in a host material harder than the pins will now be described with reference to Table 1 and FIGS. 7 through 9 illustrating representative pins after insertion and removal. All pins were produced from AISI 6150 alloy steel heat-treated to RC 43–49, and were installed into A-2 steel test blocks hardened to RC 60–62 for ½ of the expanded length of the pin. The comparative insertion and retention test data is listed in Table 1 below.

TABLE 1

| Test Criteria | Helical Grooved Pin | Grooved Pin | Knurled Pin |
|---|---|---|---|
| Insertion (lbf) | | | |
| Average | 212.5 | 410.8 | 712.6 |
| Standard Deviation | 58.7 | 120.0 | 121.6 |
| Retention (lbf) | | | |
| Average | 169.8 | 213.3 | 237.6 |
| Standard Deviation | 39.9 | 74.4 | 81.8 |
| Retention:Insertion | 80% | 52% | 33% |
| Pin Measurements (inch) | | | |
| Hole Size | φ.1180 | φ.1200 | φ.1200 |
| Body φ | φ.1155 | φ.1175 | φ.1165 |
| Expanded φ | φ.120 | φ.127 | φ.130 |
| Pin Specifications(inch) | | | |
| Hole Size | φ.1177/.1185 | φ.1181/.1205 | φ.1181/.1205 |
| Body φ | φ.115/.117 | φ.1165/.1181 | φ.1161/.1181 |
| Expanded φ | φ.1193/.1213 | φ.125/.130 | φ.128/.132 |

All pins tested were measured to be near their respective mean dimensions for body and expanded diameter. In an effort to keep a similar relationship between body diameter and hole size, the holes for the Helical Grooved Pin were produced towards the mean, while the holes for the Grooved Pin and Knurled Pin were produced towards the high end of their hole tolerance. The body and hole diameters for the Helical Grooved Pin tested are slightly different than the other pins.

The insertion force is much less for the Helical Grooved Pin, than for the other pins tested. This can be attributed to the special groove configuration and reduced expanded diameter, which by design keep the expanded portion from being damaged during installation. This design can also be credited for the helical grooved pin's superior retention: insertion force ratio and consistent test data, since the retention feature of the pin is not being sheared off during installation. FIGS. 7 through 9 illustrate pins that were installed and removed during the test.

The Prior Art Knurled and Grooved Pins of FIGS. 7 and 8, respectively, clearly show signs of damage from installation, as the bottom halves of the expanded diameter have been skived off. This was the anticipated result for the knurled pin, however the competitive grooved pin was expected to demonstrate more resilience than it did. The Helical Grooved Pin shows no sign of damage to the naked eye, and it is difficult to detect the minor surface scratches from installation when examining the pin with a 5× magnification eye loupe.

It is evident from the test photos that the Helical Grooved Pin is the only solid pin tested that maintains its integrity when installed into a hardened hole. This results in more consistent insertion and retention forces, as well as a greater ratio of retention:insertion force.

The inventive helical grooved pin retention:insertion force ratio is approximately 0.8. The prior art knurled pin required over three times the insertion force and provided an retention:insertion force ratio of approximately 0.33. The prior art grooved pin required almost twice the insertion force and provided an retention:insertion force ratio of approximately 0.52. The standard deviation of the forces for insertion and retention for the prior art pins were also markedly higher than those for the inventive helical grooved pin, indicating a more consistent interface between the inventive pin and the hole in the host material. These experimental results indicate that the inventive helical grooved pin is unexpectedly superior to prior art expanded pins when employed in a hard host material.

The inventive helical grooved pins 10 are formed by a process that begins with a cylindrical stock of a diameter D1. The stock is cut to length and the ends are typically chamfered. A rolling die is used to apply mechanical pressure to flow pin material into the groove and land configuration. An aspect of the present invention relates to the die surfaces used to define the land surfaces of the finished pin. The die is constructed to contact the lands to make the land surfaces substantially uniform and cylindrical. In the prior art pins, the raised features are not compacted in this manner. Further, the peaks or crests were desired for engagement with the softer host material. In the inventive helical grooved pin 10, it is desired that the land surfaces be substantially uniform and cylindrical so as to present a predictable retaining surface to the hole in the host material. In accordance with the present invention, this is accomplished by using a rolling die which pushes material from the groove 18 to form the land 16 and also shapes the land material to form a wide, low profile, and regularly formed pattern. As a result, at least a portion of each resulting land is a substantially cylindrical surface parallel to and having a substantially uniform radial displacement from the longitudinal axis. In the preferred embodiment, a majority of each land is a substantially cylindrical surface parallel to and having a substantially uniform radial displacement from the longitudinal axis. The phrase "a majority" as used in the context of describing and claiming the lands 16 is intended to mean "greater than approximately 50%".

The formed pins are then heat treated to the desired hardness and provided with a desired coating to protect the pin material from oxidation. The formed pins may be left soft for use in conjunction with other host materials.

The inventive helical grooved pin is described with particular emphasis on a particular embodiment illustrated in FIGS. 3–6 and 9. This embodiment of the inventive pin was also used in the experiment described with reference to Table 1. The illustrated embodiment exemplifies aspects of the invention relating to the dimensions and distribution of the raised portion of a pin. As will be recognized by those of skill in the art, all manufacturing processes and raw materials have tolerances. For example, the pin stock diameter is stated to be 0.116" plus or minus 0.001" for a max of 0.117" and a min of 0.115". With reference to Table 1, the last entries for Hole Size, Body Diameter and Expanded Diameter are given as ranges with upper and lower limits. Comparing the smallest pin stock diameter (0.115") to the largest expanded diameter (0.1213) produces a ratio of 1.054, while comparing the largest pin stock diameter (0.117") to the smallest expanded diameter (0.1193" produces a ratio of 1.019. Using the average body size of 0.1155" and the average expanded diameter of 0.120" gives a ratio of 1.039. Thus, the expanded portion of the pin is between 5.4% and 1.9% larger than the stock diameter, depending upon which values are used to make the calculation. The ratios and dimensions discussed in the specification and claims employ average dimensions and should be interpreted to encompass the ranges of ratios or dimensions that result from manufacturing tolerances.

Illustrated in FIGS. 10 and 11 are Tables 2 and 3 giving exemplary ranges of dimensions for the pin stock (body diameter) D1, host hole diameter D3 and expanded diameter D2 for a range of helical grooved pins in metric and English dimensions. Tables 2 and 3 give ranges for the ratio of expanded diameter D2 to the pin stock diameter D1 and the ratio of expanded diameter D2 to the hole diameter D3. It can be seen that manufacturing tolerances have a larger impact on smaller diameter pins and holes because the tolerance represents a greater proportion of the dimensions being measured. For the smallest pins, the average ratio of expanded diameter D2 to pin stock diameter D1 is approximately 1.085, while this ratio for the largest pins averages approximately 1.02. Ratios and dimensions recited in the claims should be interpreted as applying to average dimensions with the understanding that manufacturing tolerances may have a significant impact on the proportions of any given pin selected from a group.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A pin for insertion in a hole in a host material and frictional engagement therein, comprising:
   an elongated cylindrical body having a longitudinal axis, a cylindrical pilot portion having a first diameter, and a formed portion defined by a plurality of alternating helical lands and grooves, a second diameter and a width measured perpendicular to said longitudinal axis, a majority of each said land is a substantially cylindrical surface having a substantially uniform height extending above said first diameter, said width being at least approximately and said grooves having a depth greater than said height; and
   wherein said lands are oriented at an angle of approximately 450 ° relative to said longitudinal axis.

2. The pin of claim 1, wherein said second diameter is no greater than approximately 90 % a larger than said first diameter.

3. The pin of claim 1, wherein said lands have a surface area that is at least approximately 40 ° of a surface area of said formed portion.

4. The pin of claim 1, wherein said width is between five and fifteen times said height.

5. The pin of claim 1, wherein said second diameter is 0.02 mm to 0.1 mm larger than the first diameter.

6. The pin of claim 1, wherein the host material has a first hardness and said pin has a second hardness, said first hardness and second hardness measured on the Rockwell Rc scale and said first hardness is approximately 10 points higher on the Rockwell Rc scale than said second hardness.

7. The pin of claim 1, wherein said pilot portion is intermediate said formed portion and an end of said pin.

8. The pin of claim 1, said pin having opposed ends and comprising a cylindrical pilot portion intermediate the formed portion and each of said ends.

9. The pin of claim 1, wherein said grooves have a width measured perpendicular to said longitudinal axis and the width of said grooves is approximately equal to the width of said lands.

* * * * *

UNITED STATES PATENT AND TRADEMARK OFFICE
CERTIFICATE OF CORRECTION

| | | |
|---|---|---|
| PATENT NO. | : 7,214,021 B2 | Page 1 of 1 |
| APPLICATION NO. | : 10/743940 | |
| DATED | : May 8, 2007 | |
| INVENTOR(S) | : Caponi | |

It is certified that error appears in the above-identified patent and that said Letters Patent is hereby corrected as shown below:

<u>Column 7</u>:

Line 30, after "grooves," insert --each said land having--.

<u>Column 8</u>:

Line 1, after "surface" insert --parallel to said longitudinal axis--.

Line 3, after "approximately" insert --five times said height--.

Line 6, before "relative" delete "450 °" and insert --45°--.

Line 8, after "approximately" delete "90 % a" and insert --9%--.

Line 11, after "approximately" delete "40 °" and insert --40%--.

Signed and Sealed this

Sixth Day of November, 2007

JON W. DUDAS
*Director of the United States Patent and Trademark Office*